United States Patent
Tsukada et al.

(10) Patent No.: US 9,789,908 B2
(45) Date of Patent: Oct. 17, 2017

(54) IMPACT LOAD REDUCTION STRUCTURE

(71) Applicant: Fuji Jukogyo Kabushiki Kaisha, Tokyo (JP)

(72) Inventors: Takehisa Tsukada, Tokyo (JP); Hiroshi Matsuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/261,525

(22) Filed: Sep. 9, 2016

(65) Prior Publication Data

US 2017/0088181 A1 Mar. 30, 2017

(30) Foreign Application Priority Data

Sep. 30, 2015 (JP) ................................. 2015-193461

(51) Int. Cl.
| | | |
|---|---|---|
| *B62D 21/15* | (2006.01) | |
| *B60K 1/04* | (2006.01) | |
| *B62D 25/08* | (2006.01) | |
| *B62D 25/20* | (2006.01) | |

(52) U.S. Cl.
CPC .............. *B62D 21/155* (2013.01); *B60K 1/04* (2013.01); *B62D 25/082* (2013.01); *B62D 25/2018* (2013.01); *B60K 2001/0438* (2013.01); *B60Y 2306/01* (2013.01)

(58) Field of Classification Search
CPC combination set(s) only.
See application file for complete search history.

(56) References Cited

U.S. PATENT DOCUMENTS

| | | | |
|---|---|---|---|
| 5,048,888 A | * 9/1991 | Willy ................... | B62D 21/155 296/187.03 |
| 2004/0101745 A1 | 5/2004 | Kawasaki et al. | |
| 2010/0201159 A1 | * 8/2010 | Chretien .............. | B62D 21/152 296/193.03 |
| 2011/0316295 A1 | * 12/2011 | Yamada ............... | B62D 21/155 293/132 |
| 2012/0028135 A1 | * 2/2012 | Ohashi ................... | B62D 25/20 429/400 |

(Continued)

FOREIGN PATENT DOCUMENTS

| | | | |
|---|---|---|---|
| DE | 102014004853 A1 | * 10/2015 | ............... B60K 1/04 |
| JP | H06-270692 A | 9/1994 | |

(Continued)

OTHER PUBLICATIONS

Japanese Office Action dated Nov. 29, 2016 with an English translation thereof.

*Primary Examiner* — Nicole T Verley
(74) *Attorney, Agent, or Firm* — McGinn IP Law Group, PLLC

(57) ABSTRACT

An impact load reduction structure includes a battery frame and a load reduction frame. The battery frame is fixed to a vehicle body frame of an electrically-powered vehicle and supports a battery. The load reduction frame is disposed so as to extend in a front-rear direction on a front side of the battery frame. A rear section of the load reduction frame is disposed facing a front section of the battery frame with a predetermined gap therebetween such that the load reduction frame comes into contact with the battery frame when the electrically-powered vehicle is involved in a collision.

20 Claims, 3 Drawing Sheets

(56) References Cited

U.S. PATENT DOCUMENTS

| | | | | |
|---|---|---|---|---|
| 2012/0097466 A1* | 4/2012 | Usami | ............... | B60K 1/04 |
| | | | | 180/68.5 |
| 2012/0235396 A1* | 9/2012 | Tan | ............... | B62D 29/008 |
| | | | | 280/784 |
| 2013/0119706 A1* | 5/2013 | Katayama | ............ | B62D 21/152 |
| | | | | 296/187.09 |
| 2013/0270030 A1* | 10/2013 | Young | ............... | B62D 21/155 |
| | | | | 180/274 |
| 2014/0329125 A1* | 11/2014 | Miyanaga | ............ | B60R 13/0861 |
| | | | | 429/100 |
| 2015/0061272 A1* | 3/2015 | Watanabe | ............ | B62D 21/11 |
| | | | | 280/784 |
| 2016/0288837 A1* | 10/2016 | Sagara | ............... | B62D 21/155 |

FOREIGN PATENT DOCUMENTS

| | | |
|---|---|---|
| JP | 2001-097048 A | 4/2001 |
| JP | 2004-161092 A | 6/2004 |
| JP | 2012-240586 A | 12/2012 |
| JP | 2013-014276 A | 1/2013 |
| WO | WO 2014/038346 A1 | 3/2014 |

* cited by examiner

IMPACT LOAD REDUCTION STRUCTURE

CROSS-REFERENCE TO RELATED APPLICATIONS

The present application claims priority from Japanese Patent Application No. 2015-193461 filed on Sep. 30, 2015, the entire contents of which are hereby incorporated by reference.

BACKGROUND

1. Technical Field

The present invention relates to impact load reduction structures, and particularly, to an impact load reduction structure that reduces an impact load transmitted to a battery for driving an electrically-powered vehicle.

2. Related Art

Batteries installed in electrically-powered vehicles, such as electric vehicles and hybrid vehicles, require large capacity and have large weight. Therefore, an electrically-powered vehicle is normally provided with a battery frame for supporting a battery. For instance, the battery frame is provided in a large space under the floor of the vehicle cabin, and a plurality of batteries are collectively disposed within the battery frame. There is a demand for a technology for suppressing an input of a large external impact load when an electrically-powered vehicle is involved in a collision.

As an impact load reduction structure that reduces transmission of an impact load to a battery, for instance, Japanese Unexamined Patent Application Publication (JP-A) No. 2013-14276 proposes an electric-vehicle battery support structure that can reliably distribute a load input from the front section of the vehicle. This electric-vehicle battery support structure is provided with a protrusion that protrudes downward from the floor surface, extends in the front-rear direction of the vehicle, and supports batteries. The front end of this protrusion is coupled to the rear end of a front side frame. Accordingly, a load input to the front side frame from the front section of the vehicle can be transmitted and distributed to the rear of the vehicle via the protrusion.

However, in the electric-vehicle battery support structure in JP-A 2013-14276, a vehicle body frame, such as the front side frame, is securely fixed to the protrusion, which supports the batteries, from the front side. Thus, when the front section of the electric vehicle makes a collision, an impact load transmitted through the vehicle body frame is input to the protrusion at once, possibly causing a large impact load to be input to the batteries. In particular, since an impact load increases rapidly in an early stage of a collision, there is a demand for a technology for reducing transmission of the impact load to the batteries in the early stage of the collision.

SUMMARY OF THE INVENTION

It is desirable to provide an impact load reduction structure that reliably reduces an impact load transmitted to a battery.

An aspect of the present invention provides an impact load reduction structure that reduces an impact load transmitted to a battery for driving an electrically-powered vehicle. The impact load reduction structure includes a battery frame and a load reduction frame. The battery frame is fixed to a vehicle body frame of the electrically-powered vehicle and supports the battery. The load reduction frame is disposed so as to extend in a front-rear direction on a front side of the battery frame. A rear section of the load reduction frame is disposed facing a front section of the battery frame with a predetermined gap therebetween such that the load reduction frame comes into contact with the battery frame when the electrically-powered vehicle is involved in a collision.

The load reduction frame may be disposed in a substantially same plane as the battery frame.

Furthermore, the battery frame may be disposed under a floor of a vehicle cabin, and the load reduction frame may be disposed so as to extend rearward from near a front section of the electrically-powered vehicle.

Furthermore, the load reduction frame may have lower rigidity than the battery frame.

Furthermore, the load reduction frame may have side frames in pairs extending in the front-rear direction on opposite sides of the electrically-powered vehicle, and the battery frame may have side frames in pairs extending in the front-rear direction on the opposite sides of the electrically-powered vehicle. Moreover, front ends of the side frames in pairs of the battery frame may be positioned on extensions of the side frames in pairs of the load reduction frame.

Furthermore, the load reduction frame may have a rear frame extending in a vehicle width direction at the rear section, and the battery frame may have a front frame extending in the vehicle width direction at the front section. Moreover, the rear frame of the load reduction frame may be disposed parallel to the front frame of the battery frame.

Furthermore, the load reduction frame may have a guide that widens in an up-down direction rearward from the rear section so as to guide the front section of the battery frame to a front surface of the rear section of the load reduction frame.

Furthermore, the vehicle body frame may have front side frames in pairs spaced apart from each other in a vehicle width direction and extending rearward from near a front section of the electrically-powered vehicle and may also have floor side frames in pairs coupled to rear ends of the front side frames in pairs and extending rearward under a floor of a vehicle cabin. The load reduction frame may be fixed to the front side frames in pairs. The battery frame may be disposed within the floor side frames in pairs and may be fixed to the floor side frames in pairs.

DETAILED DESCRIPTION

An example of the present invention will be described below with reference to the appended drawings.

Figure 1:
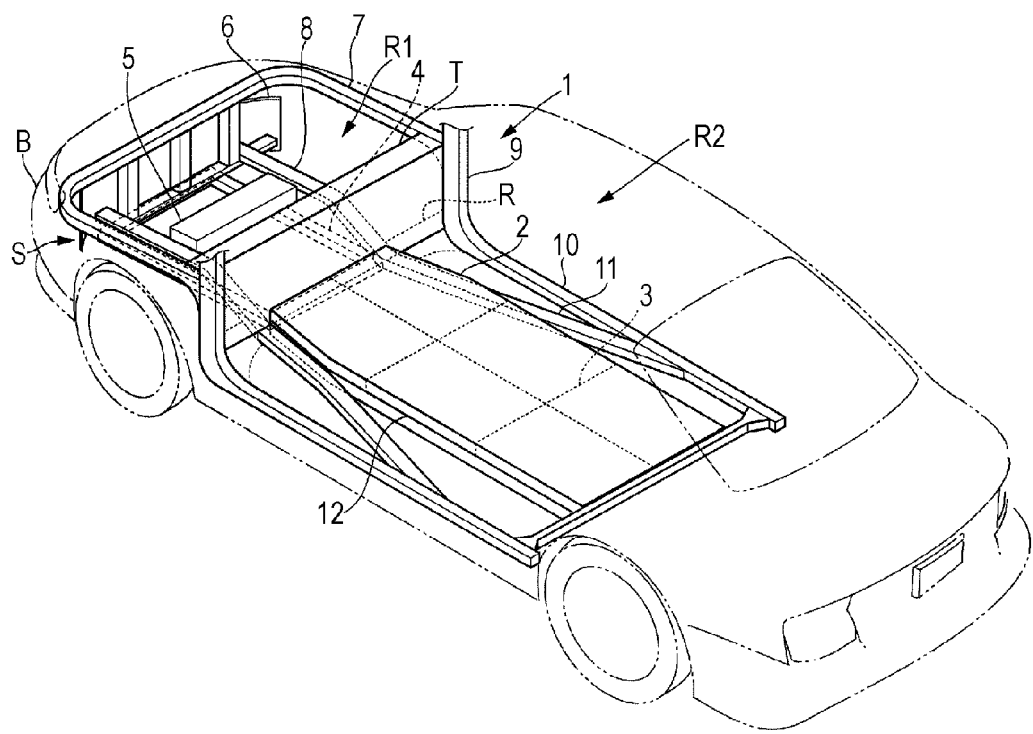
FIG. 1 illustrates the configuration of a vehicle equipped with an impact load reduction structure according to an example of the present invention.

FIG. 1 illustrates the configuration of an electric vehicle equipped with an impact load reduction structure according to an example of the present invention. This electric vehicle has a vehicle body frame 1 that supports a vehicle body, a battery housing 2 fixed to the vehicle body frame 1, a plurality of batteries 3 disposed within the battery housing 2, a sub frame 4 disposed on the front side of the battery housing 2, and a driving unit 5 electrically coupled to the plurality of batteries 3 via wires (not illustrated).

The vehicle body frame 1 has a bumper frame 6, a pair of front upper frames 7, a pair of front side frames 8, a pair of front pillars 9, a pair of side sills 10, and a pair of floor side frames 11.

The bumper frame 6 is disposed at the front section of the electric vehicle and supports a bumper B. The bumper frame 6 extends in a curved manner in the vehicle width direction. The bumper frame 6 and the bumper B have a crash area S that deforms first and absorbs an impact load when the front section of the electric vehicle makes a collision.

The front upper frames 7 extend rearward from near the front section of the electric vehicle on the opposite sides thereof, and the rear ends of the front upper frames 7 are coupled to the front pillars 9.

The front side frames 8 extend in the front-rear direction within the front upper frames 7. The front ends of the front side frames 8 are coupled to the bumper frame 6, and the rear ends of the front side frames 8 are coupled to the floor side frames 11. Moreover, the rear ends of the front side frames 8 are coupled to the side sills 10 via a rigid member R, such as a torque box.

The front pillars 9 extend in the up-down direction on the opposite sides of the electric vehicle, and a toe board T is disposed so as to couple the front pillars 9 to each other. A front chamber R1 is formed on the front side of the toe board T, and a vehicle cabin R2 is formed on the rear side of the toe board T.

The front ends of the side sills 10 are coupled to the lower ends of the front pillars 9. The side sills 10 are formed under the floor of the vehicle cabin R2 so as to extend rearward along the opposite sides of the electric vehicle.

The floor side frames 11 extend in the front-rear direction within the side sills 10. The front ends of the floor side frames 11 are coupled to the front side frames 8, and the rear ends of the floor side frames 11 are coupled to the side sills 10. Therefore, the floor side frames 11 are disposed so as to expand sideways gradually from the front ends toward the rear ends. Specifically, the floor side frames 11 extend rearward while the distance between one floor side frame 11 and the other floor side frame 11 gradually increases.

The battery housing 2 is for securely fixing the positions of the plurality of batteries 3 accommodated therein. The battery housing 2 collectively covers the plurality of batteries 3 and has high rigidity. The battery housing 2 is disposed so as to extend between the floor side frames 11 under the floor of the vehicle cabin R2. Below the battery housing 2, a box-shaped battery frame 12 is provided along the outer edges of the battery housing 2. The batteries 3 are supported from below by this battery frame 12.

The batteries 3 are charged by electric power supplied from an external power source and are accommodated within the battery housing 2. The batteries 3 have large capacity for driving the driving unit 5 and also have large weight. Therefore, the weight of the battery housing 2 accommodating the batteries 3 is extremely large at, for instance, about 300 kg.

The sub frame 4 is disposed so as to extend rearward within the front chamber R1 from near the bumper B toward the front section of the battery frame 12. In one example of the present invention, the sub frame 4 functions as a load reduction frame.

The driving unit 5 includes, for instance, a motor that is driven by electric power supplied from the batteries 3 and is coupled to, for instance, tires within the front chamber R1.

Figure 2:
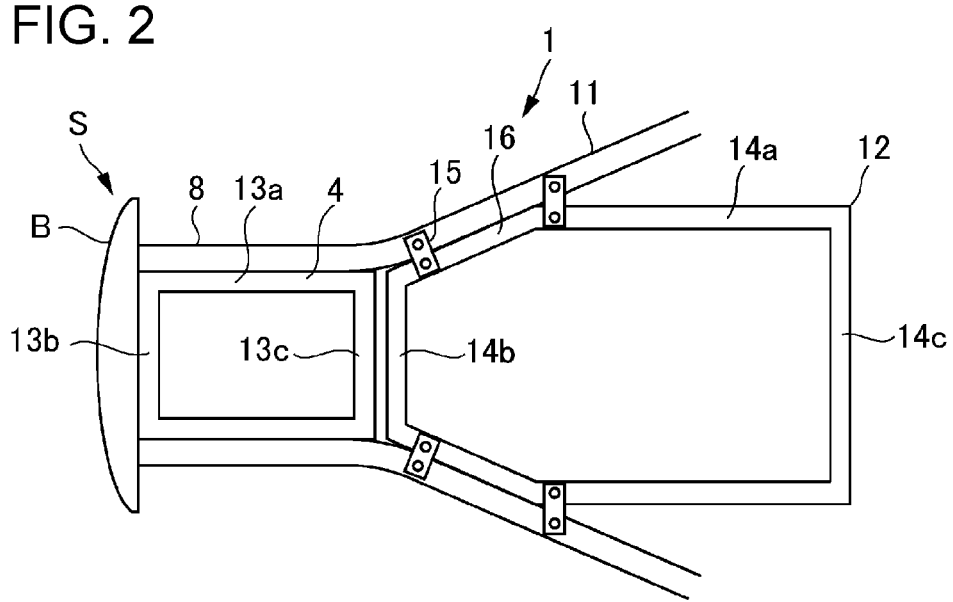
FIG. 2 is a bottom view illustrating a relevant part of the impact load reduction structure.

FIG. 2 illustrates the configuration of the sub frame 4 in detail.

The sub frame 4 is disposed so as to be positioned in the same plane as the battery frame 12. The battery frame 12 has a pair of side frames 14a extending in the front-rear direction on the opposite sides of the electric vehicle, a front frame 14b extending in the vehicle width direction and coupling the front ends of the side frames 14a to each other, and a rear frame 14c extending in the vehicle width direction and coupling the rear ends of the side frames 14a to each other. The side frames 14a, the front frame 14b, and the rear frame 14c are disposed so as to be positioned in substantially the same plane within the floor side frames 11.

The front sections of the side frames 14a have abutment sections 16 extending along the floor side frames 11. The abutment sections 16 are formed such that the side frames 14a are inwardly inclined toward the front ends thereof. Specifically, the abutment sections 16 are formed such that the distance therebetween gradually decreases toward the front. The rear sections of the side frames 14a extend straight toward the rear. The front frame 14b extends in the vehicle width direction along the toe board T, and the rear frame 14c extends in the vehicle width direction. A plurality of fixation sections 15 are disposed below the battery frame 12. These plurality of fixation sections 15 couple and fix the battery frame 12 to the floor side frames 11.

When a forward inertia force occurs in the battery frame 12 due to a collision of the electric vehicle, the sub frame 4 receives and supports the battery frame 12 from the front side. The sub frame 4 has side frames 13a in pairs extending in the front-rear direction on the opposite sides of the electric vehicle, a front frame 13b that couples the front ends of the side frames 13a to each other, and a rear frame 13c that couples the rear ends of the side frames 13a to each other.

The side frames 13a are formed parallel to each other and extend rearward and straight from the front ends toward the rear ends. The side frames 13a are disposed such that the front ends of the side frames 14a of the battery frame 12 are positioned on the extensions of the side frames 13a. Therefore, the rear ends of the side frames 13a are disposed facing the front ends of the side frames 14a. Furthermore, the front frame 13b and the rear frame 13c extend parallel to the front frame 14b of the battery frame 12 in the vehicle width direction. The sub frame 4 is coupled and fixed to the front side frames 8 via fixation sections (not illustrated).

Figure 3:
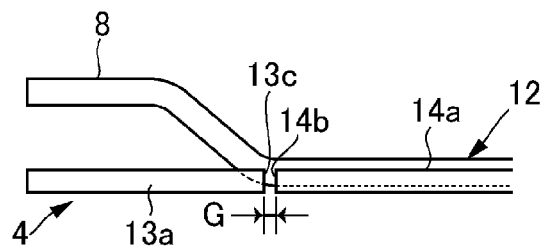
FIG. 3 is a side view illustrating a relevant part of the impact load reduction structure.

As illustrated in FIG. 3, the rear frame 13c of the sub frame 4 is disposed facing the front frame 14b of the battery frame 12 with a predetermined gap G therebetween such that the sub frame 4 comes into contact with the battery frame 12 when the electric vehicle is involved in a collision.

Next, the operation according to this example will be described.

Figure 4:
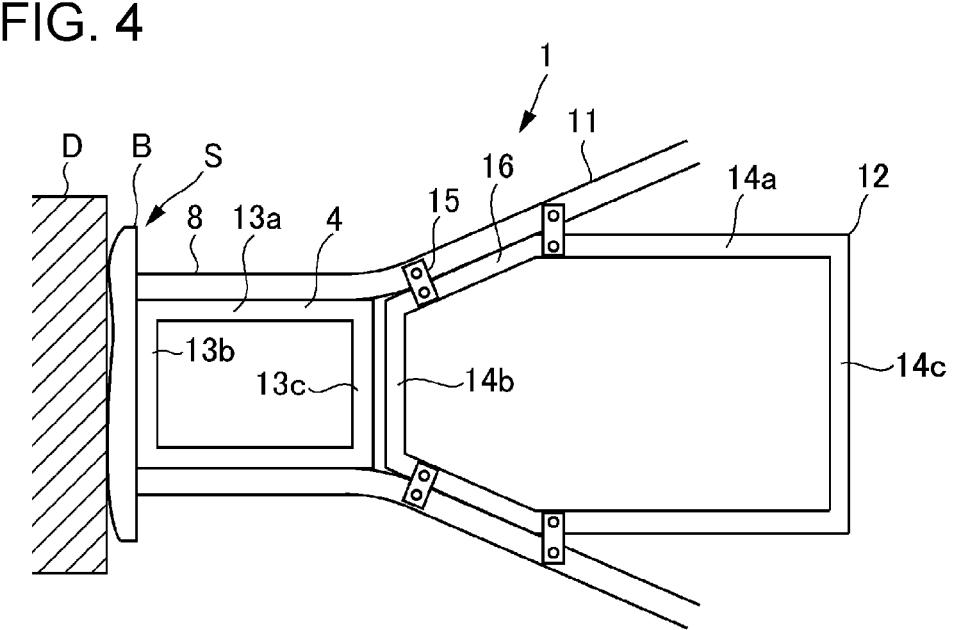
FIG. 4 illustrates a state where a bumper is deformed in an early stage of a collision.

First, when the front section of the electric vehicle illustrated in FIG. 1 makes a collision, such as a full-wrap frontal collision, with an impactor D, the front section of the electric vehicle receives an impact load. As illustrated in FIG. 4, in the early stage of the collision, the crash area S of the bumper B deforms in a crushed manner, whereas other areas of the vehicle body frame 1 hardly deform. The impact load input from the bumper B is transmitted rearward via the front upper frames 7, the front side frames 8, and the sub frame 4.

In detail, the impact load input to the front upper frames 7 is transmitted to the side sills 10 via the front pillars 9.

Furthermore, the impact load input to the front side frames 8 is transmitted to the floor side frames 11 and also to the side sills 10 via the rigid member R. Moreover, the impact load input to the sub frame 4 is transmitted to the front side frames 8 via fixation sections (not illustrated) and is transmitted from the front side frames 8 to the floor side frames 11 and the side sills 10.

In this case, as illustrated in FIGS. 2 and 3, since the sub frame 4 is disposed facing the battery frame 12 with the predetermined gap G therebetween, the impact load is not directly input from the sub frame 4 to the battery frame 12. The battery frame 12 only receives a portion of the impact load transmitted through the floor side frames 11. Therefore, in the early stage of the collision, the battery frame 12 is prevented from receiving the impact load at once, thereby reducing an increase in the impact load.

In the battery frame 12, a forward inertia force is generated due to the collision, and the abutment sections 16 are brought into abutment with the floor side frames 11. In the early stage of the collision, the abutment sections 16 are supported by the floor side frames 11 so that forward movement of the battery frame 12 is suppressed.

Figure 5:
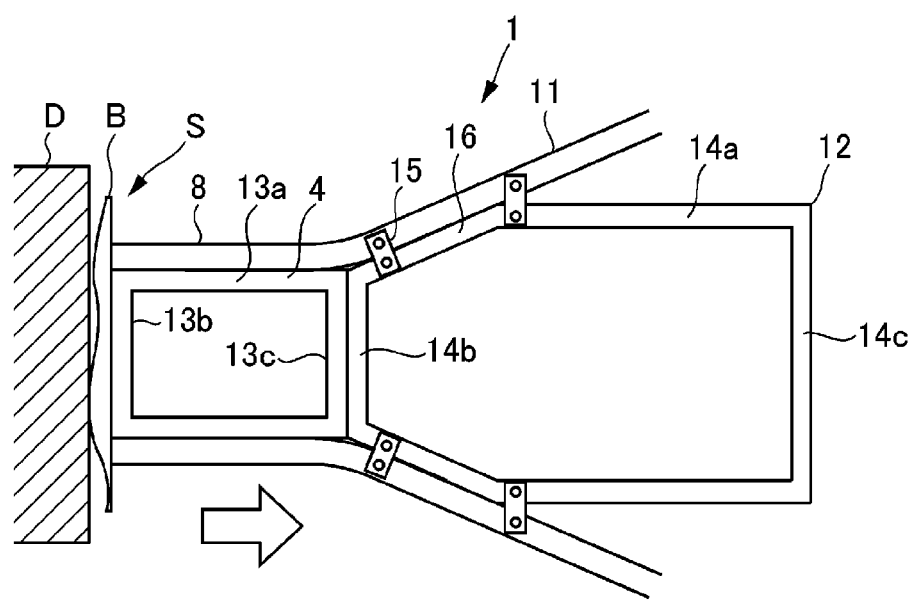
FIG. 5 illustrates a state where a sub frame is in contact with a battery frame.

Subsequently, when the crash area S of the bumper B completely deforms so that the early stage of the collision ends, the sub frame 4 is pushed rearward by the pressure from the impactor D, as illustrated in FIG. 5, thereby causing the rear frame 13c of the sub frame 4 to come into contact with the front frame 14b of the battery frame 12. When the early stage of the collision ends, areas of the vehicle body frame 1 other than the crash area S deform so that the deformation load becomes larger than the deformation load of the crash area S. Therefore, although the forward inertia force occurring in the battery frame 12 increases, since the sub frame 4 comes into contact with the battery frame 12 when the early stage of the collision ends, the battery frame 12 can be supported by the sub frame 4 from the front side. Consequently, when the early stage of the collision ends, forward movement of the battery frame 12 can be reliably suppressed.

In the related art, in order to prevent the battery frame 12 from moving forward due to a collision, for instance, the front frame 14b is securely fixed to the vehicle body frame 1. Therefore, there is a possibility that a large impact load is transmitted to the battery frame 12 at once via the vehicle body frame 1 from the early stage of the collision. In this example of the present invention, the sub frame 4 is disposed facing the battery frame 12 with the predetermined gap G therebetween so that forward movement of the battery frame 12 is suppressed while the impact load transmitted to the battery frame 12 in the early stage of the collision can be reduced.

Since the sub frame 4 is disposed such that the front ends of the side frames 14a of the battery frame 12 are positioned on the extensions of the side frames 13a, the sub frame 4 can reliably support the battery frame 12 from the front side.

Furthermore, since the sub frame 4 is disposed such that the rear frame 13c is parallel to the front frame 14b of the battery frame 12, the sub frame 4 can come into contact with the battery frame 12 with a wide area, whereby the sub frame 4 can securely support the battery frame 12 from the front side.

Moreover, since forward movement of the battery frame 12 is suppressed by simply disposing the sub frame 4 on the front side of the battery frame 12, it is not necessary to securely fix, for instance, the front frame 14b of the battery frame 12 to the vehicle body frame 1, thereby reducing the weight of the electric vehicle as well as simplifying the assembly process thereof.

The sub frame 4 preferably has lower rigidity than the battery frame 12. Accordingly, when the sub frame 4 comes into contact with the battery frame 12, the sub frame 4 can be made to preferentially deform, so that the impact load input to the battery frame 12 can be reliably suppressed.

According to this example, the rear section of the sub frame 4 is disposed facing the front section of the battery frame 12 with the predetermined gap G therebetween such that the sub frame 4 comes into contact with the battery frame 12 when the electric vehicle is involved in a collision. Therefore, the impact load input to the battery frame 12 in the early stage of the collision can be reduced, so that the impact load transmitted to the batteries 3 can be reliably reduced.

In the above-described example, the predetermined gap G formed between the sub frame 4 and the battery frame 12 is set such that the sub frame 4 comes into contact with the battery frame 12 when the early stage of the collision ends. Alternatively, the predetermined gap G is not limited to this configuration so long as the sub frame 4 can come into contact with the battery frame 12 when the electric vehicle is involved in a collision. However, the predetermined gap G is preferably set such that the rear frame 13c of the sub frame 4 and the front frame 14b of the battery frame 12 come into contact with each other simultaneously with the end of the early stage of the collision, that is, simultaneously with complete deformation of the crash area S of the bumper B. For instance, the predetermined gap G can be set to about 3 mm to 30 mm.

Furthermore, the sub frame 4 is preferably provided with a guide that widens in the up-down direction rearward from the rear section so as to guide the front section of the battery frame 12 to the front surface of the rear section of the sub frame 4.

Figure 6:
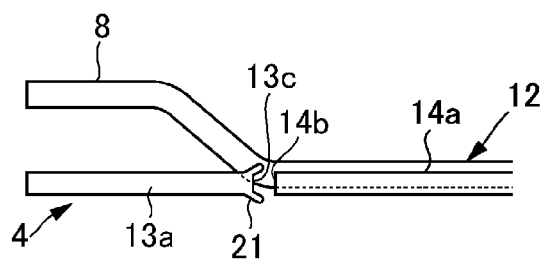
FIG. 6 is a side view illustrating a relevant part of an impact load reduction structure according to a modification.

For instance, as illustrated in FIG. 6, a guide 21 that widens in the up-down direction from the upper edge and the lower edge of the rear frame 13c of the sub frame 4 may be provided. This guide 21 extends along the upper edge and the lower edge of the rear frame 13c. Accordingly, even when the battery frame 12 and the sub frame 4 become positionally displaced in the up-down direction, the front frame 14b of the battery frame 12 can be reliably guided to the front surface of the rear section of the sub frame 4.

Although the impact load reduction structure according to the example of the present invention is applied to an electric vehicle in the above-described example, a vehicle to which the impact load reduction structure according to the example of the present invention is applied is not limited to an electric vehicle so long as the impact load reduction structure according to the example of the present invention is applied to an electrically-powered vehicle equipped with a large-capacity battery for, for instance, electrically driving a driving unit. For instance, the impact load reduction structure according to the example of the present invention may be applied to a hybrid vehicle.

The invention claimed is:

1. An impact load reduction structure configured to reduce an impact load transmitted to a battery for driving an electrically-powered vehicle, the impact load reduction structure comprising:
 a crash area that is disposed in a front section of the electrically-powered vehicle and configured to deform in a collision;

a battery frame that is disposed rearward of the crash area and fixed to a vehicle body frame of the electrically-powered vehicle, the battery frame being configured to support the battery and to be engaged with the vehicle body frame in accordance with an inertia force of the collision to be supported from a frontward area; and a load reduction frame that is disposed so as to extend in a front-rear direction on a front side of the battery frame, wherein the load reduction frame extends rearward toward the battery frame from near the crash area and is movable rearward by being pushed after the deformation of the crash area, and a rear section of the load reduction frame is disposed facing a front section of the battery frame with a predetermined gap therebetween such that the load reduction frame comes into contact with the battery frame when the electrically-powered vehicle is involved in a collision.

2. The impact load reduction structure according to claim 1, wherein the load reduction frame is disposed in a substantially same plane as the battery frame.

3. The impact load reduction structure according to claim 2, wherein the battery frame is disposed under a floor of a vehicle cabin.

4. The impact load reduction structure according to claim 2, wherein the load reduction frame has lower rigidity than the battery frame.

5. The impact load reduction structure according to claim 2, wherein the load reduction frame comprises side frames in pairs extending in the front-rear direction on opposite sides of the electrically-powered vehicle, and the battery frame comprises side frames in pairs extending in the front-rear direction on the opposite sides of the electrically-powered vehicle, and wherein front ends of the frames of the battery frame are positioned on extensions of the side frames of the load reduction frame.

6. The impact load reduction structure according to claim 2, wherein the load reduction frame comprises a rear frame extending in a vehicle width direction at the rear section, and the battery frame comprises a front frame extending in the vehicle width direction at the front section, and wherein the rear frame of the load reduction frame is disposed parallel to the front frame of the battery frame.

7. The impact load reduction structure according to claim 2, wherein the load reduction frame comprises a guide that widens in a vertical direction rearward from the rear section so as to guide the front section of the battery frame to a front surface of the rear section of the load reduction frame.

8. The impact load reduction structure according to claim 2, wherein the vehicle body frame comprises front side frames in pairs spaced apart from each other in a vehicle width direction and extending rearward from near a front section of the electrically-powered vehicle and comprises floor side frames in pairs coupled to rear ends of the front side frames and extending rearward under a floor of a vehicle cabin, wherein the load reduction frame is fixed to front side frames in pairs, and wherein the battery frame is disposed within the floor side frames in pairs and is fixed to the floor side frames in pairs.

9. The impact load reduction structure according to claim 1, wherein the battery frame is disposed under a floor of a vehicle cabin.

10. The impact load reduction structure according to claim 9, wherein the load reduction frame has lower rigidity than the battery frame.

11. The impact load reduction structure according to claim 9, wherein the load reduction frame comprise side frames in pairs extending in the front-rear direction on opposite sides of the electrically-powered vehicle, and the battery frame has comprises side frames in pairs extending in the front-mar direction on the opposite sides of the electrically-powered vehicle, and wherein front ends of the frames of the battery frame are positioned on extensions of the side frames of the load reduction frame.

12. The impact load reduction structure according to claim 9, wherein the load reduction frame comprises a rear frame extending in a vehicle width direction at the rear section, and the battery frame comprises a front frame extending in the vehicle width direction at the front section, and wherein the rear frame of the load reduction frame is disposed parallel to the front frame of the battery frame.

13. The impact load reduction structure according to claim 9, wherein the load reduction frame comprises a guide that widens in a vertical direction rearward from the rear section so as to guide the front section of the battery frame to a front surface of the rear section of the load reduction frame.

14. The impact load reduction structure according to claim 9, wherein the vehicle body frame comprises front side frames in pairs spaced apart from each other in a vehicle width direction and extending rearward from near a front section of the electrically-powered vehicle and comprises floor side frames in pairs coupled to rear ends of the front side frames and extending rearward under a floor of a vehicle cabin, wherein the load reduction frame is fixed to front side frames in pairs, and wherein the battery frame is disposed within the floor side frames in pairs and is fixed to the floor side frames in pairs.

15. The impact load reduction structure according to claim 1, wherein the load reduction frame has lower rigidity than the battery frame.

16. The impact load reduction structure according to claim 1, wherein the load reduction frame is disposed in a same plane as the battery frame and contacts with the battery frame with a wide area, and the load reduction frame has side frames which are formed parallel in pairs extending in the front-rear direction and a front frame and a rear frame which are formed parallel in pairs extending in the vehicle width direction, and wherein the front frame couples the front ends of the side frames to each other, and the rear frame couples the rear ends of the side frames to each other.

17. An impact load reduction structure that reduces an impact load transmitted to a battery for driving an electrically-powered vehicle, the impact load reduction structure comprising:

a battery frame that is fixed to a vehicle body frame of the electrically-powered vehicle and that supports the battery; and a load reduction frame that is disposed so as to extend in a front-rear direction on a front side of the batter frame, wherein a rear section of the load reduction frame is disposed facing a front section of the battery frame with a predetermined gap therebetween such that the load reduction frame comes into contact with the battery frame when the electrically-powered vehicle is involved in a collision, wherein the load reduction frame comprises side frames in pairs extending in the front-rear direction on opposite sides of the electrically-powered vehicle, and the battery frame comprises side frames in pairs extending in the front-rear direction on the opposite sides of the electrically-powered vehicle, and wherein front ends of the frames of the battery frame are positioned on extensions of the side frames of the load reduction frame.

18. An impact load reduction structure that reduces an impact load transmitted to a battery for driving an electrically-powered vehicle, the impact load reduction structure comprising:

a battery frame that is fixed to a vehicle body frame of the electrically-powered vehicle and that supports the battery; and a load reduction frame that is disposed so as to extend in a front-rear direction on a front side of the battery frame, wherein a rear section of the load reduction frame is disposed facing a front section of the battery frame with a predetermined gap therebetween such that the load reduction frame comes into contact with the battery frame when the electrically-powered vehicle is involved in a collision, wherein the load reduction frame comprises a rear frame extending in a vehicle width direction at the rear section, and the battery frame comprises a font frame extending in the vehicle width direction at the front section, and wherein the rear frame of the load reduction frame is disposed parallel to the front frame of the battery frame.

19. An impact load reduction structure that reduces an impact load transmitted to a battery for driving an electrically-powered vehicle the impact load reduction structure comprising:

a battery frame that is fixed to a vehicle body frame of the electrically-powered vehicle and that supports the battery; and a load reduction frame that is disposed so as to extend in a front-rear direction on a front side of the battery frame, wherein a rear section of the load reduction frame is disposed facing a front section of the battery frame with a predetermined gap therebetween such that the load reduction frame comes into contact with the battery frame when the electrically-powered vehicle is involved in a collision, wherein the load reduction frame comprises a guide that widens in a vertical direction rearward from the rear section so as to guide the front section of the battery frame to a front surface of the rear section of the load reduction frame.

20. An impact load reduction structure that reduces an impact load transmitted to a battery for driving an electrically-powered vehicle, the impact load reduction structure comprising:

a battery frame that is fixed to a vehicle body frame of the electrically-powered vehicle and that supports the battery; and a load reduction frame that is disposed so as to extend in a front-rear direction on a front side of the battery frame, wherein a rear section of the load reduction frame is disposed facing a front section of the battery frame with a predetermined gap therebetween such that the load reduction frame comes into contact with the battery frame when the electrically-powered vehicle is involved in a collision, wherein the vehicle body frame comprises front side frames in pairs spaced apart from each other in a vehicle width direction and extending rearward from near a front section of the electrically-powered vehicle and comprises floor side frames in pairs coupled to rear ends of the front side frames and extending rearward under a floor of a vehicle cabin, wherein the load reduction frame is fixed to front side frames in pairs, and wherein the battery frame is disposed within the floor side frames in pairs and is fixed to the floor side frames in pairs.

* * * * *